Dec. 31, 1963   F. W. R. STARP   3,115,817
PHOTOGRAPHIC CAMERA
Filed May 25, 1960
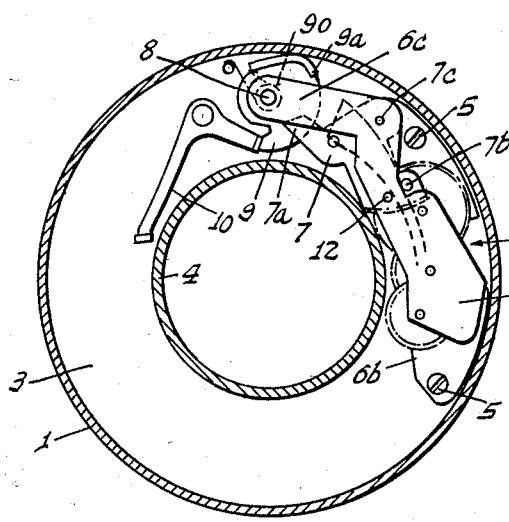
Fig. 1
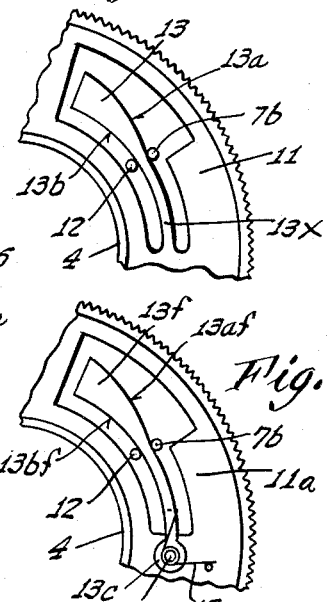
Fig. 2
Fig. 3
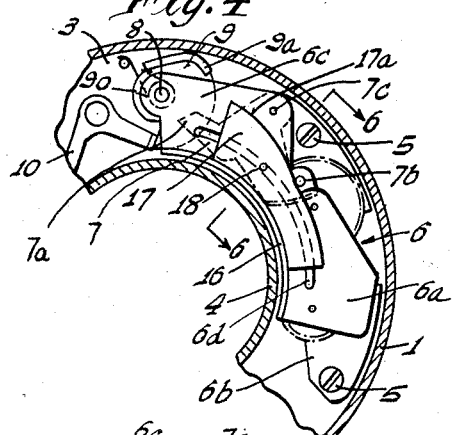
Fig. 4
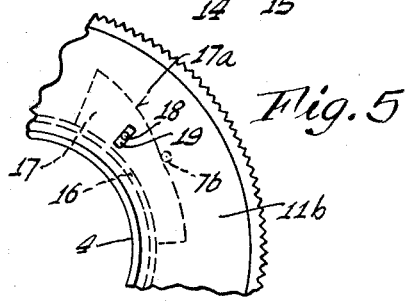
Fig. 5
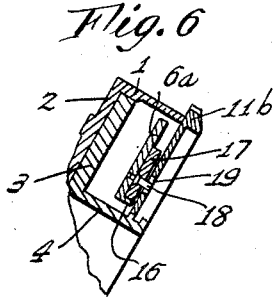
Fig. 6
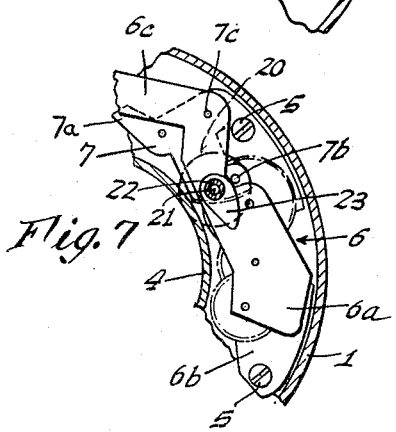
Fig. 7
INVENTOR
FRANZ W. R. STARP
BY
March, Gillette, Virgil & Eslinger
ATTORNEYS

3,115,817
PHOTOGRAPHIC CAMERA

Franz W. R. Starp, Calmbach (Enz), Germany, assignor to Alfred Gauthier, G.m.b.H., Calmbach (Enz), Germany, a corporation of Germany
Filed May 25, 1960, Ser. No. 31,762
Claims priority, application Germany May 26, 1959
4 Claims. (Cl. 95—63)

This invention relates to photographic cameras of the type wherein the shutter speed or exposure time is regulated by the use of an escapement mechanism which is actuated by the shutter driving member and is settable at various speeds or stages by means of an exposure time or speed setting member.

In photographic cameras of the above described kind, and especially in cameras having intra-lens shutter structures, the shutter driving member is generally rotatably positioned on a shutter base plate, and the exposure time escapement mechanism is also secured to the same base plate by means of screws in such a manner that the relative position of the escapement mechanism with respect to the driving member can be changed within narrow limits. A slight change or shifting of the escapement mechanism in this manner enables the braking lever or equivalent device of the mechanism, which is engaged by and which retards the shutter driving member, to be adjustably positioned with respect to the latter in order to obtain an exposure time of a predetermined specific magnitude as the driving member of the shutter moves through its intended path of movement. However, such adjustment of the escapement mechanism is not only time consuming but requires a certain amount of skill, which increases appreciably the production cost of the camera or shutter structure.

Whether or not the indicated exposure time thus obtained accurately coincides with the actual exposure time depends not only on the specific relative positions of the escapement mechanism and the shutter driving member, but also on the effecting of a certain relative position of the exposure time or speed setting member, which has one or more cams, with respect to the escapement mechanism. This means that special requirements must be fulfilled, from a technical and manufacturing standpoint, as regards the positioning means and also the guiding or bearing means provided for the speed setting member. These requirements include particularly critical or tight bearing tolerances in order to prevent the exposure-time or speed setting member from deviating or shifting undesirably in a radial direction, and this must be effected without impairing the easy mobility or ease of movement of the speed setting member during its adjustment. The aforementioned conditions relating to the speed setting member involve an appreciable amount of working time and production expense, as does also the adjustment of the escapement mechanism with respect to the shutter driving member.

The above drawbacks and disadvantages of prior cameras are obviated by the present invention, and one object of the invention is to provide a novel and improved photographic camera of the general type set forth above, and especially to provide a shutter construction for such a camera whereby the same, especially when mass produced, has the greatest possible accuracy with respect to enabling the adjusted and indicated shutter speed to coincide with the actual speed, said accuracy being obtained with the least possible expenditure from a technical and manufacturing viewpoint, and without requiring adjusting operations during assembly, which involve time-consuming skill and attention, and further always are subject to the possibility of human error.

This is accomplished, in accordance with the invention, by the provision of a structural organization wherein the escape-mechanism is constituted as a reference base with respect to the shutter driving member and also with respect to the exposure time or speed setting member.

As compared with known shutters or cameras having the usual or conventional exposure time escapement mechanism, a shutter constituted in the described manner as provided by the invention is characterized by an optimal accuracy as regards enabling the adjusted and indicated exposure time of the assembled components to coincide with the actual exposure time, this being effected by a simple construction which requires no adjustment whatsoever with respect to determining the positions of the shutter driving member, the speed setting member and the escapement mechanism with respect to each other.

An organization which is especially economical to fabricate and produce from a technical and manufacturing viewpoint, and one which promotes a simple and easy assembly of the camera shutter with respect to the escapement mechanism and the shutter driving member, is obtained by utilizing the bearing plate of the escapement mechanism, which serves to position the components of such mechanism, as a means for accurately determining and effecting the relative position of the shutter driving member with respect to such escapement mechanism. The said bearing plate is constituted as a guide member, having an extension or arm arranged to be connected to the bearing of the shutter driving member.

To accurately determine the position of the speed setting member with respect to the escapement mechanism, the said bearing plate of the latter is provided, in an equally advantageous manner, with a stop or abutment which is engaged by a member or portion of the speed setting member which is constituted as a cam under the action of a biasing spring and which influences the escapement mechanism; also, such positioning is determined by the provision of a guide or bearing which is separate from the said stop or abutment and which determines the path of movement of the speed setting member.

A construction as provided by the invention which is particularly advantageous with respect to simplicity and an uncomplicated arrangement of the shutter and is moreover independent of the respective position and construction of the speed setting member is had when the cam means or cam portion of such setting member which actuates and adjusts the escapement mechanism, is constituted as a separate piece with respect to such member. Also, a particularly favorable construction is had when the said separate cam member or means is drivingly connected with the speed setting member on the one hand, and guided as to its path of movement on the other hand by a guiding or bearing device provided on the cam means and cooperable with a companion device provided on the bearing plate of the escapement mechanism.

The invention will be explained in detail in the specification which follows and in the accompanying drawings, wherein several embodiments of the invention, as applied to an intra-lens shutter, are described.

In the drawings:

FIG. 1 is a transverse or vertical sectional view through a photographic intra-lens shutter constructed in accordance with the invention, the cover plate being removed and this view revealing interior details of construction. The structure of the escapement mechanism and its cooperation with the shutter driving member is illustrated in this figure. Those members or components of the shutter which do not relate to the invention have been omitted for reasons of clarity of illustration.

FIG. 2 is a fragmentary front elevational view of the speed setting member and control or cam member constructed in accordance with the invention, said view illustrating the positions of these components with respect to the escapement mechanism shown in FIG. 1.

FIG. 3 is a view similar to that of FIG. 2, but showing a control or cam member which is slightly different from that illustrated in the preceding figure.

FIG. 4 is a fragmentary transverse or vertical sectional view through an intra-lens shutter construction, this view being somewhat similar to the section of FIG. 1 and illustrating another embodiment of the invention.

FIG. 5 is a fragmentary elevational view of a speed setting member suitable for use with the construction illustrated in FIG. 4, showing the cooperation of the components involved with said member, for effecting an adjustment of the shutter speed.

FIG. 6 is a fragmentary axial sectional view, taken on the line 6—6 of FIG. 4.

FIG. 7 is a fragmentary transverse or vertical sectional view taken through an intra-lens shutter construction similar to that shown in FIGS. 1 and 4, but illustrating another embodiment of the invention. In this figure, the speed setting member is arranged eccentrically with respect to the shutter axis.

As shown in FIGS. 1, 4, 6 and 7, the housing of the photographic intra-lens shutter construction has been given the reference numeral 1. Affixed to the bottom 2 of the shutter housing 1 is a base plate 3 which carries a short tubular nozzle 4 of conventional construction, for the purpose of affixing the shutter structure to the front of the camera housing or case.

Within the housing 1 there is provided an escapement mechanism 6, which is affixed to the base plate 3 in a well-known manner by means of screws 5. The construction of the escapement mechanism 3 may be of a well-known kind per se, and may include a gear drive or train which is disposed between two bearing plates 6a and 6b, the latter bearing plate serving as the mounting or base plate for securing the escapement mechanism to the shutter base plate 3. A more detailed description of the escapement mechanism 6 is not given herein, since the various components or members thereof are not involved per se with the present invention and since such members have been well known in the art for a considerable period of time. Thus a detailed description is not essential to enable one skilled in the art to understand and practice the present invention.

As shown in FIGS. 1, 4 and 7, the escapement mechanism 6 of the intra-lens shutter construction includes a braking lever 7 which is drivingly connected to the other members or components of the escapement mechanism. The braking lever 7 has an arm 7a which cooperates or drives in a well-known manner with a shutter driving disk 9, the latter being rotatably mounted about an axis 8 and being acted on or powered by a tension spring 90. For such driving purpose the disk 9 has a lug 9a which, upon release and clockwise turning of the disk in response to clockwise shifting of the release lever 10, engages a sloping or cam edge provided on the lever arm 7a of the braking lever, pivoting the lever 7 about its axis 7c in a counterclockwise direction. The release lever 10 is actuated by means of a well-known release device which is not shown for the sake of clarity of illustration.

As already stated above, the effecting of a coincidence between the indicated exposure time as given by the shutter speed scale and the actual exposure time in cameras of the above general type depends not only on the specific relative positions of the escapement mechanism and the shutter driving member, but also on the specific relative positions of the speed setting member and the said escapement mechanism.

In the embodiments of the invention illustrated in FIGS. 1–6, the setting or adjusting of the shutter speed is effected by means of a setting ring which is guided on the tubular nozzle 4 of the shutter base plate, and which by means of a cam provided thereon actuates in a manner to be described later a pin 7b affixed to the braking lever 7, thereby to pivotally adjust the said braking lever.

Such adjustment shifts the braking lever arm 7a into a specific relative position with respect to the lug 9a of the driving disk 9, thereby defining a specific operating stage or adjustment of the escapement mechanism.

In accordance with the present invention, for the purpose of accurately fixing or determining the relative positions of the shutter driving member 9, of the actuating cam of the speed setting member, and of the escapement mechanism 6 the latter is used as a basis or reference means. This organization provides the important advantages already noted above.

A technically and production-wise especially simple and uncomplicated, economical construction of intra-lens shutter in accordance with the invention, as regards accurately determining the relative positions of the shutter driving disk 9 and the escapement mechanism 6 is had when the bearing plate 6a of the escapement mechanism is also constituted to have an extension 6c functioning as a guide or bearing member which is connectable to the bearing 8 of the driving member 9.

This construction of the bearing plate 6a of the escapement mechanism eliminates the necessity for any adjustment between the driving disk 9 and the escapement mechanism 6 when assembling the shutter, since the distance between the bearing 8 of the driving disk and the pivotal axis 7c of the braking lever is permanently and immovably fixed, by appropriate borings or apertures provided in the said extension 6c.

In order to accurately predetermine the position of the control or cam means of the speed setting member with respect to the escapement mechanism 6, the invention further provides a stop or abutment on the bearing plate 6a of the escapement mechanism. The control or cam means of the speed setting ring, which influences and adjusts the escapement mechanism 6, is arranged to engage the said stop or abutment under the action of a suitable spring, and there is further provided a guide or bearing, namely the tubular nozzle 4, which is separate from said stop or abutment and which determines the path of movement of the setting ring.

In the embodiment of the invention illustrated in FIGS. 1, 2 and 3 the stop or abutment which cooperates with the control or cam means is constituted as a pin 12 which is affixed to the bearing plate 6a. In FIGS. 2 and 3 two different constructions of control or cam means are shown, as well as the cooperation of such means with the stop or abutment 12 and the control or follower pin 7b which is affixed to the braking lever 7.

As shown in FIG. 2, the control or cam member 13 is constituted as an integral part of the speed setting ring 11 and has an elongate supporting portion 13x by which the cam is radially shiftable within limits by virtue of flexing of the portion 13x. The cam 13 is thus formed from the body of the ring 11 by a suitable lancing or punching operation, said cam extending in a circumferential direction with respect to the speed setting ring 11.

The pin 7b of the braking lever 7 continually engages a camming edge 13a provided on the outer portion of the cam 13. For this purpose there is provided a biasing spring (not shown) which acts on the braking lever 7 in a well-known manner and which biases the lever constantly in a clockwise direction. The lug or arm 13 shown in FIG. 2 which serves as the control or cam means has on its inner edge portion an accurate circular guide surface 13b which engages the stop pin or abutment 12 provided on the bearing plate 6a. Continual engagement between the cam 13 and the abutment pin 12 is insured by the natural springiness or resilience of the cam, as may be understood from an inspection of FIG. 2.

FIG. 3 shows another embodiment of the invention, in which the control or cam member 13f is constituted as a separate piece with respect to the speed setting member 11a. The control member 13f at one end 13c is pivotally mounted on a pin 14 which is affixed to the circular area of the speed setting ring 11a. To insure positive engagement of the cam surface 13bf of the control or cam member 13f in FIG. 3 with the stop or guide lug 12, there is provided a wire coil spring 15 which biases the control member 13f continually in a counterclockwise direction. Further, the control or cam member 13f has a camming edge 13af, with which corresponds the pin 7b of the braking lever 7.

With the above described organization embracing the speed setting members 11 and 11a the setting position of the braking lever 7 is not, as was the case in the past, defined by a cam or equivalent device rigidly connected to the speed setting member or rigidly arranged thereon, but by a control or cam means the relative position of which always depends on the relative position of the escapement mechanism 6 with respect to the shutter driving disk 9. Thus, it is no longer necessary to observe the previously required critical tolerances in manufacturing the speed setting member, or the precise positioning and guiding of the same on the shutter base plate.

FIGS. 4–6 illustrate another embodiment of the invention. In these figures there is also disclosed a control or cam member which influences or adjusts the escapement mechanism 6, said member being separate from the speed setting member and being drivingly connected thereto on the one hand, and also guided on the other hand during its adjusting movement by means of a guiding or slide device provided thereon and also on the bearing plate 6a of the escapement mechanism.

As is apparent from FIG. 4, the control member 17 shown therein has on its outwardly located portion a camming edge 17a adapted to actuate the braking lever 7. The inwardly located portion of the member 17 constitutes a bearing edge which is engageable with and bears on a flange-like bearing portion 16 of the bearing plate 6a, for the purpose of guiding and accurately predetermining the path of movement of the member 17. Further guiding of the control member 17 is effected by means of a guide or follower pin 18 which is rigidly affixed to the member 17 and extends perpendicular thereto, one end of the pin 18 passing through a guide slot 6d which extends circumferentially with respect to the shutter construction and is provided in the bearing plate 6a. In order to establish a driving connection between the control or cam member 17 and the speed setting ring 11b, the remaining end of the guide pin 18 passes through a radial slot 19 provided in the ring 11b.

The above-described organization is of advantage in various applications, as for example where the escapement mechanism and the speed setting member are spaced apart an appreciable distance axially or in those cases where a reduction of the cross section of the speed setting member in the manner shown in FIGS. 2 and 3 cannot be effected for constructional reasons or reasons of strength. The mode of operation of the arrangement shown in FIGS. 4–6 is the same as that for the shutter construction shown in FIGS. 1–3.

When the speed setting member 11b is rotated in one direction or the other the cam member 17 is shifted circumferentially by virtue of the pin 18 being disposed in the radial slot 19 of the ring. This effects a substantially radial movement of the control pin by the camming edge 17a, and hence a pivotal movement of the braking lever 7. The guiding of the cam member 17 along the slot 6d by means of the pin 18 causes the cam member 17 to remain engaged with the accurately executed guide or bearing surface of the flange 16, even when the elastic force provided by the braking lever 7 on the cam member 17 is small or slackens. Accordingly, all requirements for an optimally accurate mode of operation of the speed setting mechanism have been fulfilled by the above construction.

FIG. 7 illustrates another embodiment of the invention, which is not limited to an intra-lens shutter construction wherein the speed setting member is arranged concentrically with respect to the shutter axis.

In the embodiment of FIG. 7, the intra-lens shutter has a speed setting member which is arranged eccentrically with respect to the shutter axis and is constituted as a small adjusting wheel 20, which is indicated in broken outline in the figure, located at the front side of the shutter housing and bearing on a stationary pin 21 which is affixed to the bearing plate 6a of the escapement mechanism 6.

In order to guide the small adjusting wheel 20 on the pin 21, the wheel is provided with a sleeve 22, at one end of which (opposite the adjusting wheel 20) there is disposed an eccentric or cam disk 23.

When the setting wheel 20 is rotated for the purpose of effecting an adjustment of the shutter speed, the eccentric disk 23 is also turned by means of the sleeve 22, said disk cooperating in turn with the control pin 7b of the braking lever 7 and adjustably shifting the same, as described above in connection with the previous embodiments of the invention. The adjustable movement of the braking lever 7 into different specific relative positions with respect to the lug 9a of the shutter driving member 9 results in an adjustment of the shutter speed.

The above described embodiments of the invention show that, independently of the particular mode or type of construction by which the invention may be put into effect, there is always had the advantage that the structural members which are critical as regards the obtaining of an accurate exposure time, considering the indication on the shutter speed scale, always have an accurate and invariable relationship to each other.

This enables the expensive manufacturing methods and adjusting operations to be dispensed with, since once the individual members have been basically oriented with respect to each other, an uncomplicated mass-production may be had, wherein there is a continuing high degree of accuracy, this production insuring that the structural members comprising the shutter driving disk, the control or cam member of the speed setting member and the escapement mechanism are always assembled in the necessary manner, in accordance with the invention, with such assembly being virtually free of critical tolerances.

Moreover, the important advantages are obtained regardless of the species to which the camera and/or the shutter belongs.

I claim:

1. In a photographic camera, in combination, a shutter driving member; an exposure-time escapement mechanism operable by said driving member and having an adjustable part the positioning of which determines the exposure time; an adjustable exposure time setting member having actuator means for shifting said adjustable part to position the same; a positioning means comprising a rigid bearing structure providing relatively immovable bearings for the driving member, escapement mechanism and said actuator means whereby optimal accuracy is had in the adjustment of the exposure time by the said setting member, said rigid bearing structure comprising a bearing plate of the escapement mechanism and a rigid stop on said bearing plate, engaging the said actuator means; a spring acting on the actuator means to maintain engagement thereof with the rigid stop, said actuator means comprising a cam; and bearing means for said setting member, determining the path of movement of the same, said bearing means being separate from said rigid stop.

2. In a photographic camera, in combination, a shutter driving member; an exposure-time escapement mechanism operable by said driving member and having an adjustable part the positioning of which determines the exposure time; an adjustable exposure time setting member having actuator means for shifting said adjustable part to position the same; a positioning means comprising a rigid bearing structure providing relatively immovable bearings for the driving member, escapement mechanism and said actuator means whereby optimal accuracy is had in the adjustment of the exposure time by the said setting member, said actuator means comprising a cam which is separate from the setting member and is drivingly connected thereto, said rigid bearing structure comprising a bearing plate of the escapement mechanism; and cooperable guides on the said cam and bearing plate, accurately determining the path of movement of the cam.

3. Photographic between-the-lens shutter, the shutter drive member of which, arranged eccentrically to the shutter axis, cooperates with an exposure time escapement mechanism which has at least one supporting plate serving to support its mechanism parts and having its starting position changed by a rotatably supported exposure-time setting means, characterized by the fact that in order to determine the relative position of the shutter-drive member and of the exposure time escapement mechanism, the supporting plate of the escapement mechanism is developed as a reference base, and for this purpose having an extending arm which receives the drive shaft of the shutter drive member.

4. A camera as in claim 3 in which said plate is provided with an integral extension constituting a guide portion and having a bearing fixedly and immovably attached to said guide portion for guiding said shutter drive member.

References Cited in the file of this patent

UNITED STATES PATENTS

| | | |
|---|---|---|
| 2,410,629 | Carroll | Nov. 5, 1946 |
| 2,492,723 | Willcox | Dec. 27, 1949 |
| 2,588,980 | Hodges | Mar. 11, 1952 |